United States Patent Office 3,322,942
Patented May 30, 1967

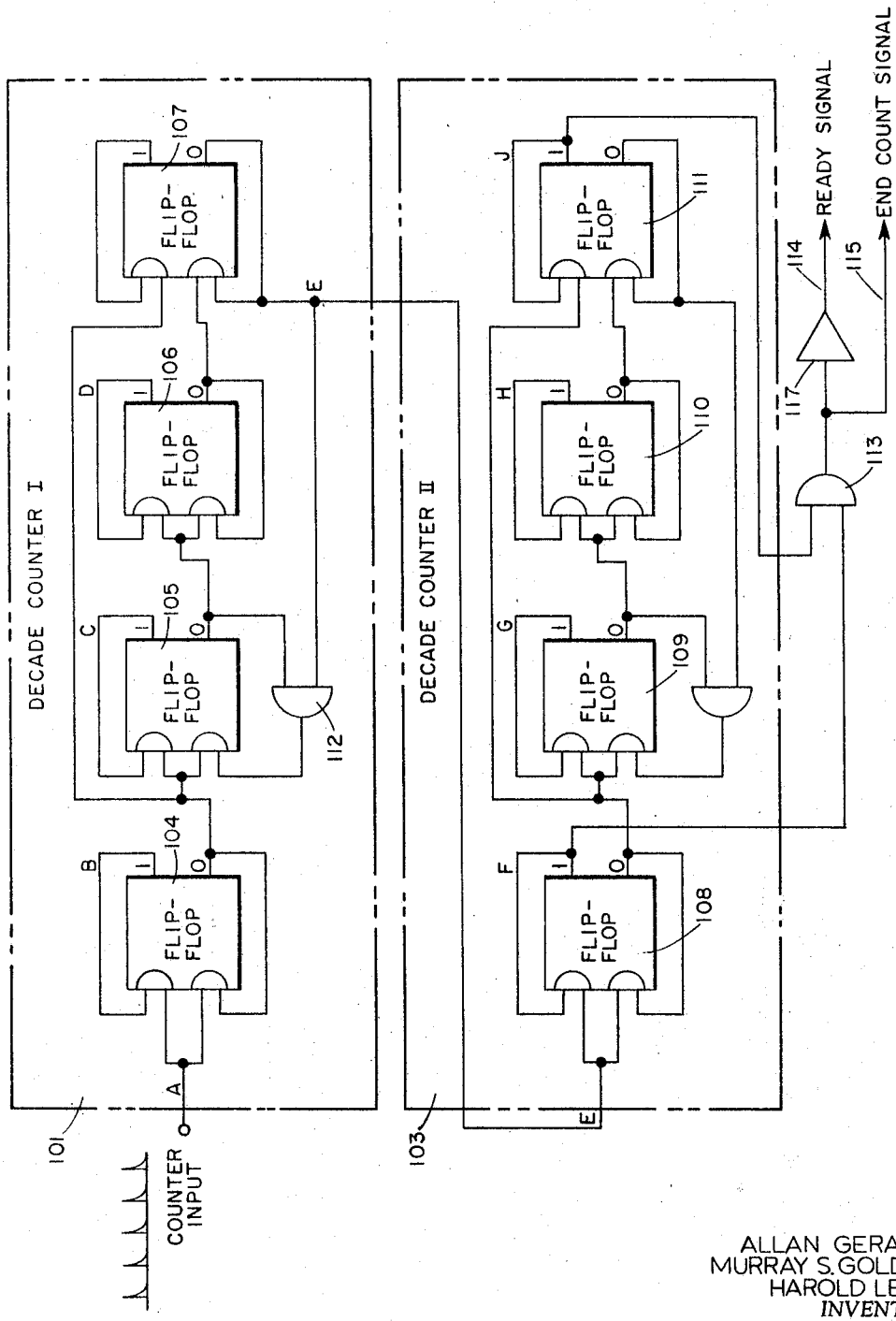

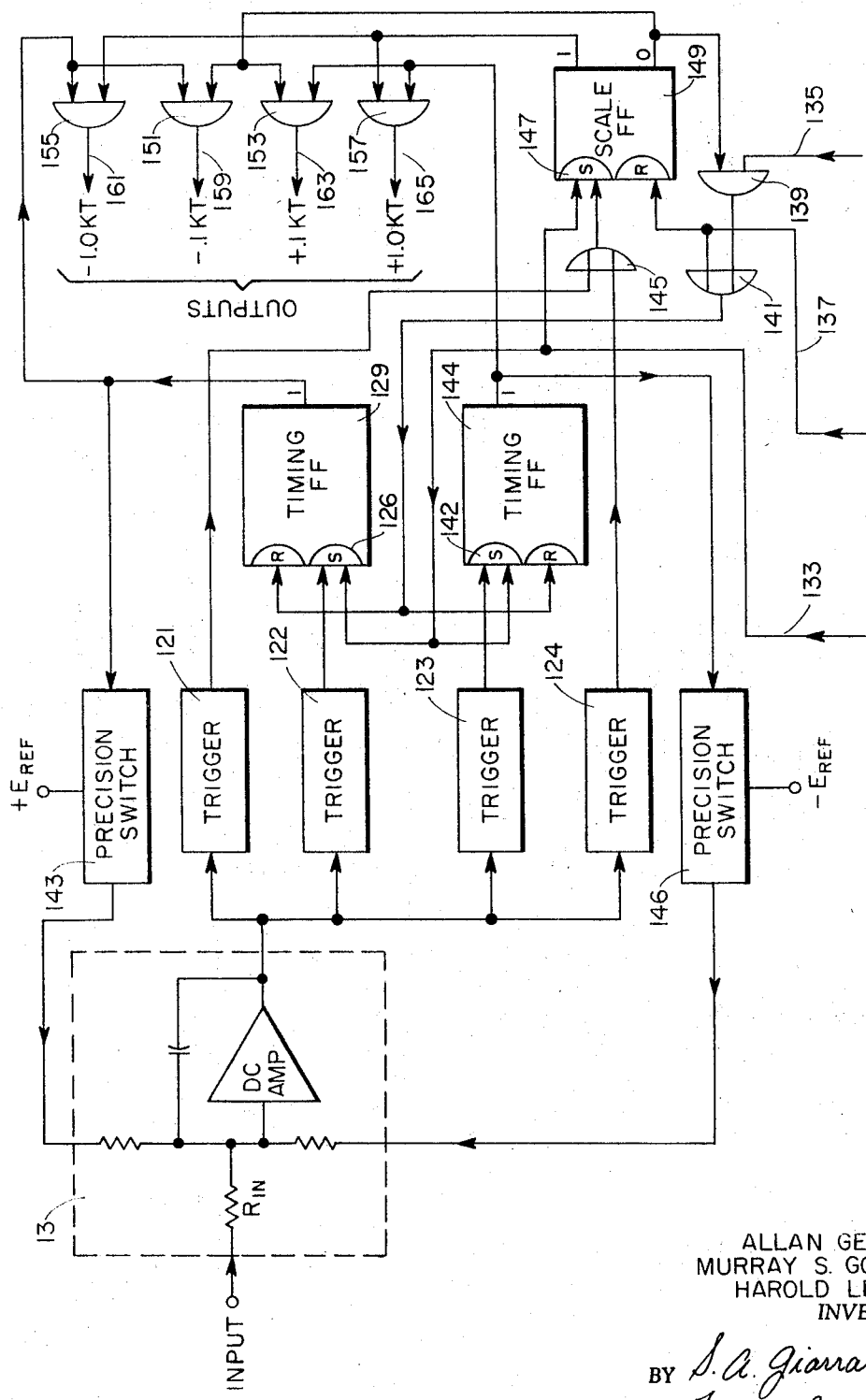

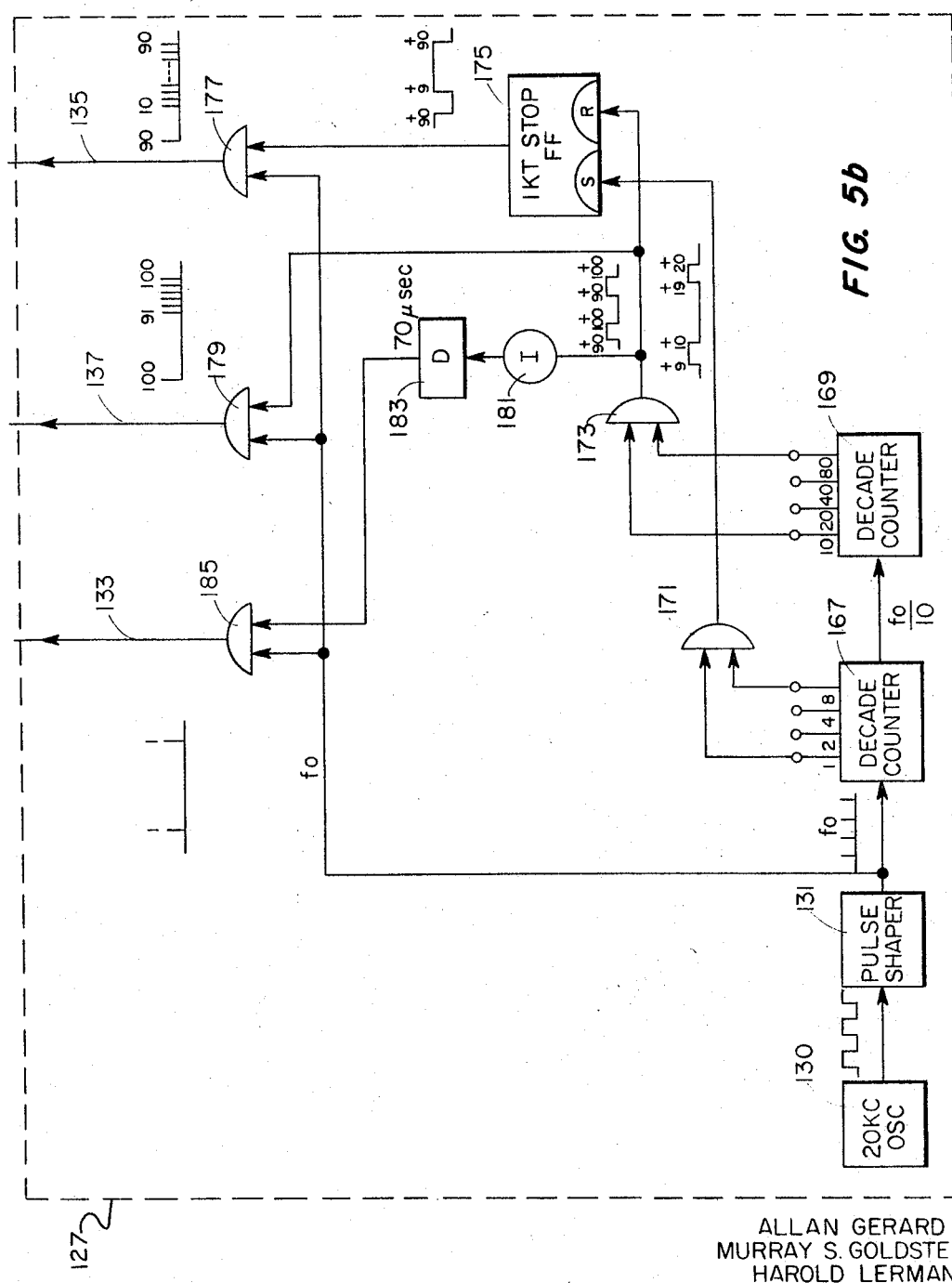

3,322,942
RESET INTEGRATOR USING DIGITAL AND
ANALOG TECHNIQUES
Allan Gerard, Fort Lee, N.J., Murray S. Goldstein, Spring
Valley, N.Y., and Harold Lerman, Paramus, N.J., assignors to General Precision Inc., Little Falls, N.J., a
corporation of Delaware
Filed May 10, 1963, Ser. No. 279,422
8 Claims. (Cl. 235—183)

This invention relates to integrators, and more particularly to an integrator which combines both a digital and an analog technique.

The quantity represented by the output signal from an integrator will usually have a maximum value. The output signal of an analog integrator is usually scaled so that the maximum signal that can be produced by the analog integrator within its linear range represents the maximum value of the quantity which the signal represents. For example, a maximum velocity might be 1500 knots and the maximum linear output signal of an analog integrator computing the velocity might be 50 volts. The output signal voltage of the integrator would therefore be scaled so that 50 volts represents 1500 knots. If the necessary resolution in velocity is 0.1 knot, which would be represented in the output signal of the integrator by 3.33 millivolts, then the noise level in the integrator must be less than 3.33 millivolts. Moreover, such a small voltage is hard to handle, yet the scale factor of the output signal voltage of the integrator cannot be increased without making the signal voltage representing 1500 knots greater than 50 volts. The accuracy of the output signal from an analog integrator is limited by drift in the amplifier of the analog integrator and by scale factor error. A large part of the amplifier drift is caused by grid leakage current. The scale factor error is caused mainly by instability of the integrating capacitor of the analog integrator. A digital integrator on the other hand does not have these problems, but it is much more complex than an analog integrator and is a lot heavier.

An object of the present invention is to use techniques of both digital and analog integrators to provide an integrator which does not have the scale factor and drift problems of an analog integrator but which is substantially less complex and of less weight than a digital integrator.

Another object of the present invention is to provide a relatively simple integrator with a high scale factor.

A further object of this invention is to provide a relatively simple integrator which has a relatively low error due to drift.

A still further object of this invention is to provide a relatively simple integrator with reduced scale factor error.

These objects are accomplished in accordance with the present invention by means of an analog integrator which has a high scale factor and which is reset to zero with a precision pulse each time the output signal of the analog integrator exceeds a predetermined value. The number of times that the analog integrator is reset to zero provides the integral of the input signal applied to the input of the analog integrator. The integrator of the present invention is called a reset integrator.

Because the analog integrator of the reset integrator is reset to zero each time its output reaches a predetermined value, the scale factor may be selected to be very high. For example, 10 volts may be selected to represent 0.1 knot and also be selected as the output signal value at which the analog integrator is reset to zero. In order to have the output of the reset integrator capable of representing 1500 knots, it is necessary merely to have a counter capable of counting to 15,000. The high scale factor can be used because the output signal voltage of the analog integrator never gets substantially above the value at which the analog integrator is reset to zero. Because of its high scale factor the reset integrator has a much higher resolution than the analog integrators of the prior art. The magnitude of the difference in resolution obtainable is demonstrated by the examples discussed above. In the example for the analog integrator, 3.33 millivolts represents 0.1 knot, whereas in the reset integrator, 10 volts represents 0.1 knot.

The feature of high scale factor also reduces the effects of amplifier drift in the output signal of the integrator. The error caused by amplifier drift due to grid leakage current depends directly on the value of the summing resistance in the analog integrator. The high scale factor in the reset integrator permits a small summing resistance to be used in the analog integrator circuit and thus the error due to amplifier drift is greatly reduced.

The reset integrator of the present invention also eliminates instability in the integrating capacitor as a cause of substantial error. In a temperature-controlled environment in which the temperature does not change more than one degree, a quality capacitor would cause a scale factor error of approximately 0.01%. In the reset integrator, the same capacitor in the same temperature-controlled environment would cause an error of 0.01% of the increment represented by each output pulse from the reset integrator. In the example described above for an analog integrator in which 50 volts represents 1500 knots, a 0.01% scale factor error results in an error of 0.15 knot at 1500 knots. In the example for the reset integrator of the present invention in which the increment represented by each output pulse is 0.1 knot, the same variation in capacitance would cause an error of 0.01% of 0.1 knot or 0.00001 knot. The reason that changes in integrating capacity do not have a substantial effect on the reset integrator is that when the capacitance does change, causing the device to reset too soon or too late, this is compensated by the reset pulse resetting the integrator back to a precise value above or below zero so that the next reset will occur at the proper time. For this reason the value of the integrating capacitor in the reset integrator of the present invention does not have to have a close tolerance or be temperature controlled. For the same reasons, variation in the output signal voltage at which the device resets is relatively unimportant. A 5% variation does not cause appreciable error.

The impulse content of the reset pulse and the ratio of the input resistance to feedback resistance are the quantities which affect the scale of the output of a reset integrator, and these quantities have to be closely controlled in the reset integrator. In an analog integrator reduction of scale factor error is sought by matching resistor characteristics to capacitor characteristics to get a constant RC time constant. In the reset integrator, reduction of scale factor error is sought by matching the characteristics of the input resistor and the feedback resistor to maintain a constant ratio. This matching can be done much more easily and more successfully than matching a resistor and a capacitor to obtain a constant RC time constant.

Many other objects and advantages of the present invention will become readily apparent as the following detailed description of the invention unfolds and when taken in conjunction with the drawings, wherein:

FIG. 4 illustrates a binary counter used in the reset integrator of the present invention to control the length of the reset pulses; and FIG. 5 consists of two parts, 5a and 5b, jointly showing a block diagram of another embodiment of the reset integrator in accordance with the present invention.

Figure 1:
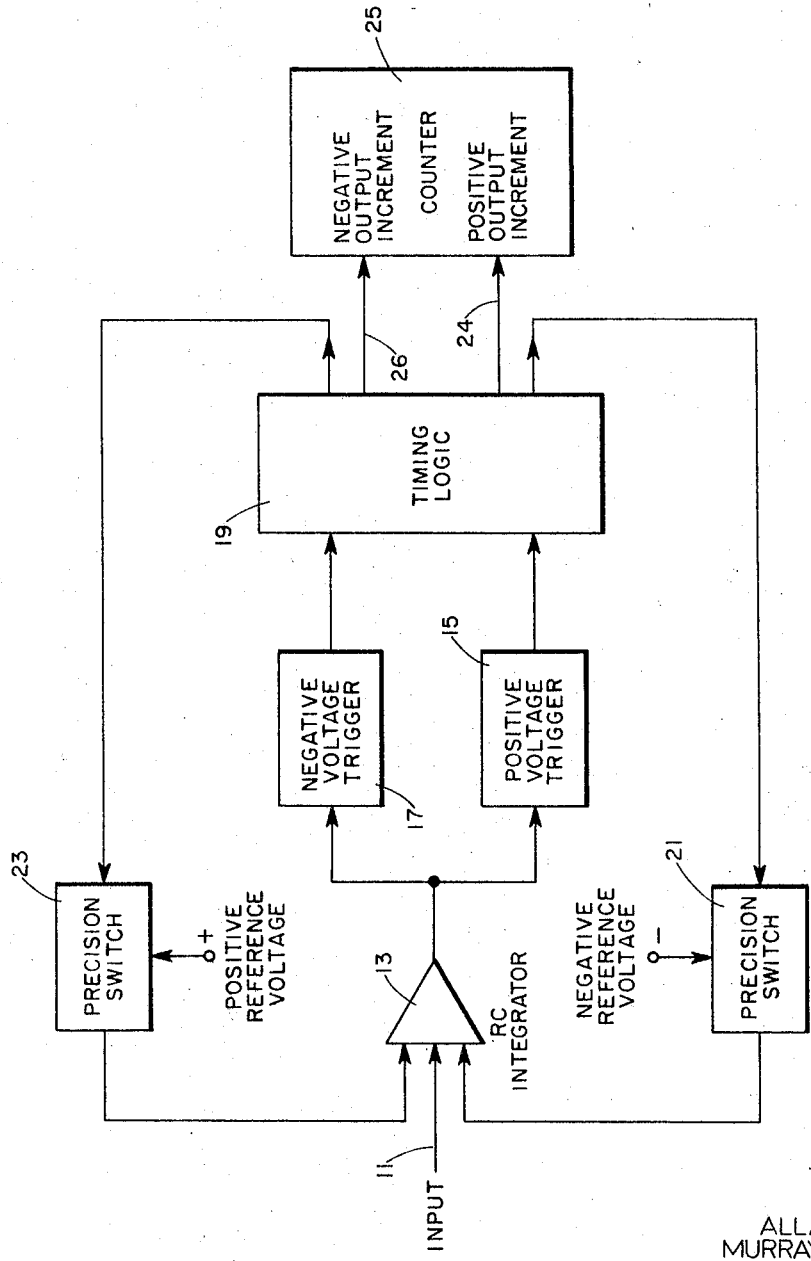
FIG. 1 is a block diagram illustrating the reset integrator of the present invention.

As shown in FIG. 1, the analog signal to be integrated is applied at an input 11. From the input 11 the signal is applied to the input of an RC analog integrator 13 which except for having a high scale factor is a conventional RC analog integrator. The output signal voltage from the RC analog integrator 13 is applied to a positive voltage trigger 15 and to a negative voltage trigger 17. The triggers 15 and 17 are set to detect when the output signal voltage of the integrator 13 reaches a predetermined magnitude. This magnitude of voltage is referred to as the trigger magnitude. The positive voltage trigger 15 detects when a positive output signal voltage of the integrator 13 reaches the trigger magnitude. Upon detecting this event the positive voltage trigger 15 applies an enabling signal to timing logic 19. The negative voltage trigger 17 detects when a negative output signal voltage of the integrator 13 reaches the trigger magnitude and in response thereto applies an enabling signal to the timing logic 19. The timing logic 19, responsive to receiving an enabling signal from the positive voltage trigger 15, closes a precision switch 21 for a precise time interval. When the precision switch 21 is closed, it applies a precisely selected negative reference voltage to the input of the integrator 13. Thus a negative pulse having a precise amplitude and a precise length is applied to the input of the integrator 13 in response to the output signal voltage of the integrator 13 being positive and reaching the trigger magnitude. The integrator 13 will integrate the applied negative pulse and reflect this integration in its output signal voltage. The length of time that the precision switch 21 is closed and the magnitude of the negative reference voltage that is applied to the integrator 13 when the precision switch 21 is closed are selected so that the impulse content of the negative pulse applied to the integrator 13 is such as to drive the output signal voltage of the integrator 13 back substantially to zero.

The timing circuit 19, in response to an enabling signal from the negative voltage trigger 17, will close a precision switch 23 for the same precise time interval that it closes the precision switch 21 in response to the enabling signal from the positive voltage trigger 15. When the precision switch 23 is closed, it applies a positive reference voltage to the integrator 13 so that a positive pulse is applied to the integrator 13 in response to a negative output voltage of the integrator 13 reaching the trigger magnitude. The positive reference voltage applied through the switch 23 to the integrator 13 has the same magnitude as the negative reference voltage applied to the integrator 13 through the switch 21. Thus when the output signal voltage of the integrator 13 is negative and reaches the trigger magnitude, a positive pulse will be applied to the integrator 13 and this positive pulse, upon being integrated by the integrator 13, will drive the output signal voltage of the integrator 13 substantially back to zero. It is not essential that the pulses applied to the integrator 13 by the precision switches 21 and 23 drive the output signal voltage of the integrator 13 precisely back to zero, but it is essential that they both have a precisely predetermined impulse content, as a variation in the impulse content of these pulses will cause a scale factor error in the output from the integrator. Each time the timing logic 19 closes the switch 21, it applies a pulse over a channel 24 to a counter 25 which, in response to such pulse, counts in the positive direction one unit. Each time the timing logic 19 closes the precision switch 23, it applies a pulse over a channel 26 to the counter 25, which in response to such pulse counts in the negative direction one unit. The count registered by the counter 25 will represent the integral of the signal applied at input 11 and the pulses produced by the timing logic 19 on channels 24 and 26 will represent positive and negative increments of this integral, respectively. The counter 25 may be a stepping motor driving an output shaft, in which case the angular position of the output shaft will represent the integral of the applied input signal, or the counter 25 may be an electronic counter. The increment that each pulse produced on channels 24 and 26 and that each unit of the count registered by the counter 25 represents can be determined from the scale factor selected for the analog integrator 13 and the selected trigger magnitude. For example, if an output signal voltage of 10 volts from the integrator 13 is selected to represent 0.1 knot and the trigger magnitude is selected to be 10 volts, then each pulse produced on channels 24 and 26 and each unit of count registered by the counter 25 will represent 0.1 knot. Actually the increment is precisely determined by the ratio of the input resistance of the integrator 13 to its feedback resistance and the impulse content of the reset pulses. However, if the scale factor of the integrator 13 and the trigger magnitude are chosen so that the reset pulses drive the output signal voltage of the integrator back to zero, then the increment can be determined from these chosen values and the increment determined from these chosen values will be correct even if the trigger magnitude actually is not at the chosen value and if the capacitance of the integrating capacitor should vary. Because the reset integrator 13 is reset to zero each time its output voltage reaches a selected magnitude, the scale factor of the integrator 13 can be made as large as desired, and all the advantages from a high scale factor in the integrator are obtained.

Figure 2:
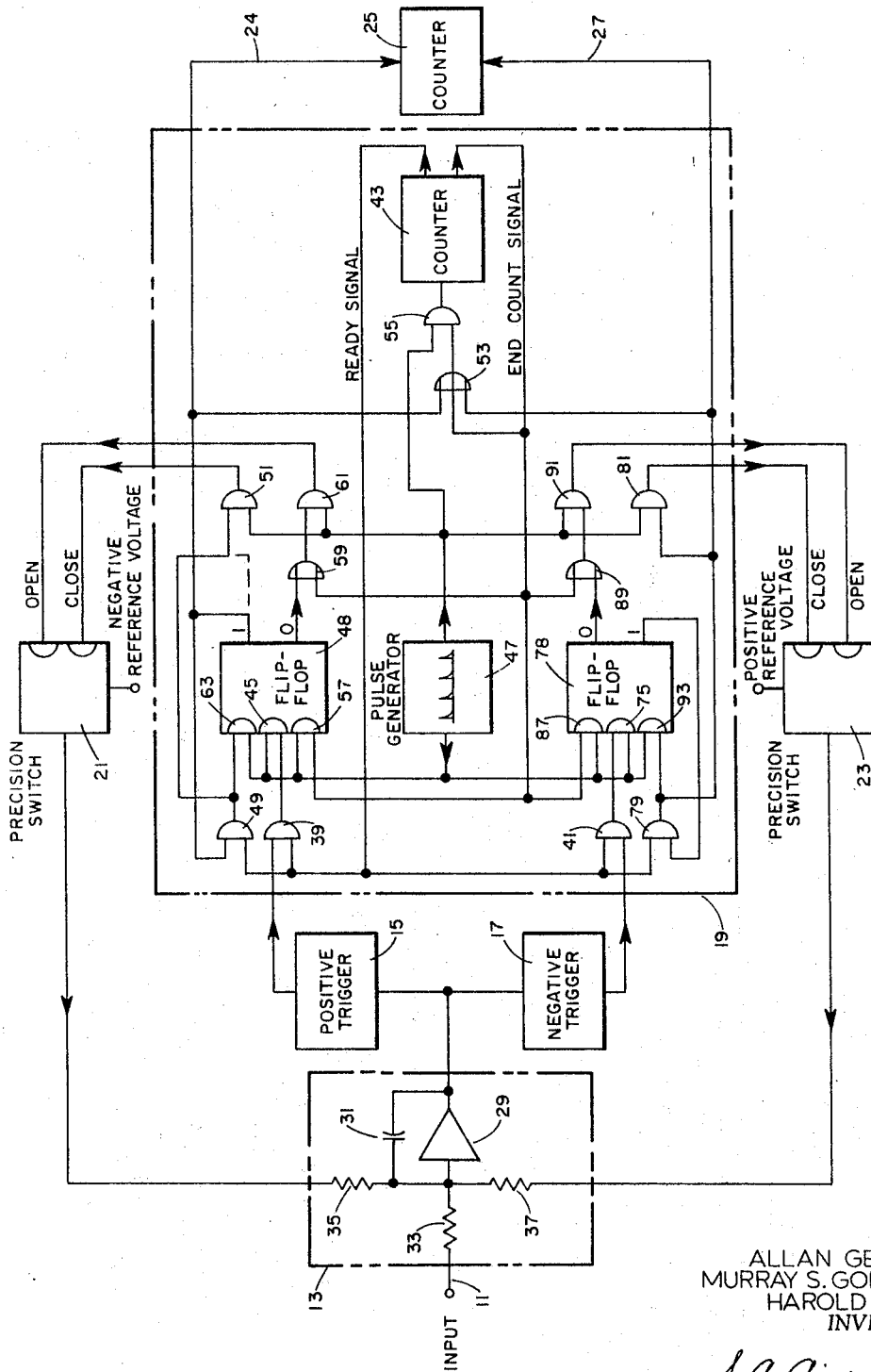
FIG. 2 is also a block diagram illustrating the reset integrator of the present invention in more detail.

FIG. 2 is a block diagram illustrating the reset integrator of the present invention in more detail. As shown in FIG. 2, the RC analog integrator 13 is a conventional analog integrator comprising a D.C. amplifier 29 and an integrating capacitor 31 connected from the output of the amplifier 29 to its input. A resistor 33 connects the input 11 to the input of the amplifier 29 and resistors 35 and 37 connect the outputs from the precision switches 21 and 23, respectively, to the input of the amplifier 29. The signal voltages applied at the input 11 and from the outputs of the switches 21 and 23 are summed through the resistors 33, 35, and 37 at the input of the D.C. amplifier 29 and the voltage produced at the output of the D.C. amplifier 29 represents the integral of the algebraic sum of these applied voltages.

Figure 3:
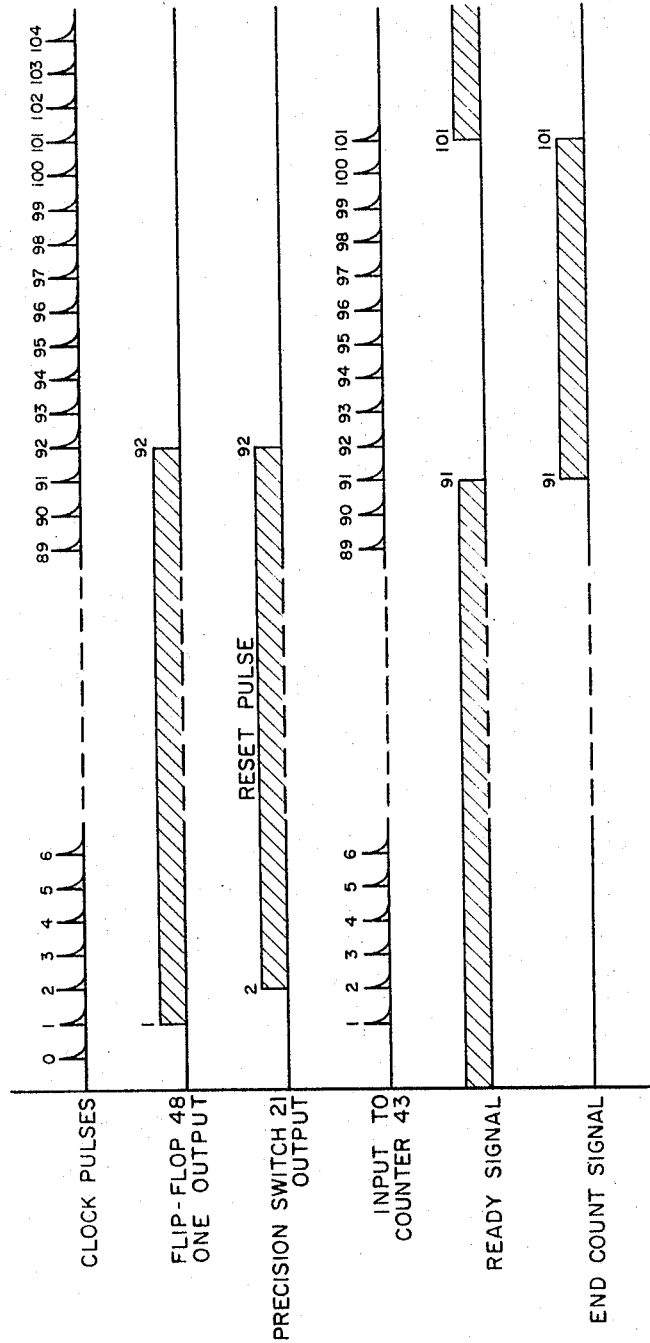
FIG. 3 illustrates voltage waveforms produced by the circuit of FIG. 2.

The enabling signal produced by the positive trigger 15, in response to a positive output signal voltage of the analog integrator 13 reaching the trigger magnitude, is applied to an AND gate 39 in the timing logic 19. The enabling signal produced by the trigger 17 in response to a negative output signal voltage from the integrator 13 reaching the trigger magnitude is applied to an AND gate 41 in the trigger logic 19. An enabling signal referred to as the ready signal is normally applied to the AND gates 39 and 41 from a counter 43 in the timing logic 19. When the AND gate 39 is receiving this ready signal from the counter 43, it will pass the enabling signal from the positive trigger 15 to an AND gate 45, enabling this AND gate 45. Pulses from a clock pulse generator 47 are also applied to the AND gate 45. After the AND gate 45 has been enabled by the enabling signal from the positive trigger 15 passing through the enabled AND gate 39, the next clock pulse from the clock pulse generator 47 will pass through the enabled AND gate 45 and set a flip-flop 48, which thereupon will produce a positive signal voltage at its ONE output. Th pulse from the clock pulse generator setting the flip-flop 48 is clock pulse No. 1 in FIG. 3. The positive signal voltage from the ONE output of the flip-flop 48 is applied to an AND gate 49, which will also be enabled by the ready signal normally produced by the counter 43. The positive voltage from the ONE output of the flip-flop 48 will therefore pass through the AND gate 49 and enable an AND gate 51, which also receives the pulses from the clock pulse generator 47. The AND gate 51, upon being enabled in this manner, passes the next pulse from the clock pulse generator 47, which pulse is clock pulse No. 2 in FIG. 3. This pulse is applied to the precision switch 21, which in response to this pulse closes and applies the negative reference voltage to the input of the analog integrator 13. The positive voltage from the ONE output of the flip-flop 48 passing through the enabled AND gate 49 also passes through an OR gate 53 and enables an AND gate 55, which also receives the pulses produced by the clock pulse generator 47. When the AND gate 55 is enabled, it will pass the pulses produced by the clock pulse generator 47 through to the binary counter 43, which counts the applied pulses. The first pulse applied to the AND gate 55 after it is enabled will be the next occurring clock pulse produced by the clock pulse generator 47 after the pulse passing through the enabled AND gate 45 and setting the flip-flop 48, or in other words clock pulse No. 2. Prior to the passing of the first pulse through the AND gate 55, the counter 43 will have a zero count registered therein. When the count registered by the counter 43 reaches 90, indicating that ninety pulses have passed through the AND gate 55, the counter 43 will stop generating the ready signal and hence the AND gates 39 and 49 will no longer be enabled. As a result the AND gate 51 will no longer be enabled by the output from the AND gate 49 and pulses from the clock pulse generator will stop passing through the AND gate 51 to the switch 21. When the counter 43 terminates the ready signal, it starts generating an end count signal, which is applied to an AND gate 61 through an OR gate 59. Since the counter 43 began counting with clock pulse No. 2, the counter 43 will reach a count of 90 at clock pulse No. 91 so the ready signal will be ended and an end count signal will be started at clock pulse No. 91 as shown in FIG. 3. The AND gate 61, which also receives pulses from the clock pulse generator 47, will be enabled upon receiving the end count signal and will pass the next pulse from the clock pulse generator to the precision switch 21, which in response to this pulse will open and disconnect the negative reference voltage from the input of the integrator 13. The clock pulse which passes through the AND gate 61 and causes the precision switch to open will be clock pulse No. 92. Thus as shown in FIG. 3 the negative pulse applied to the input of the integrator by the precision switch 21 will start at clock pulse No. 2 and end at clock pulse No. 92, and thus will have a length of precisely 90 clock pulses. The end count signal from the counter 43 is also applied to an AND gate 57. The AND gate 57 also receives the pulses produced by the clock pulse generator 47, and upon being enabled by the end count signal from the counter 43 will pass the next pulse from the clock pulse generator to the flip-flop 48 to reset it. This pulse will be clock pulse No. 92. The flip-flop 48 will then cease to produce a positive enabling voltage from its ONE output and will start producing an enabling signal voltage from its ZERO output at clock pulse No. 92, as shown in FIG. 3. When the flip-flop 48 produces a positive signal voltage from its ZERO output, this positive signal voltage will pass through the OR gate 59 to enable the AND gate 61. When the counter 43 ceases to generate the ready signal, the AND gate 49 will no longer be enabled and apply an enabling signal to the AND gate 55. However, the AND gate 55 will remain enabled by the end count signal from the counter 43 passing through the OR gate 53. Thus the pulses from the clock pulse generator 47 will continue to pass through the AND gate 55 after the counter stops generating the ready signal. Clock pulse No. 92, which is the pulse that opens the switch 21, will therefore pass through the AND gate 55 and increase the count registered by the counter 43 to 91. The counter 43 will continue to count until the count registered therein reaches 99. The next pulse passing through the AND gate 55, which will be clock pulse No. 101, will reset the count registered by the counter 43 back to zero and the counter 43 will stop generating the end count signal and start again to generate the ready signal. Thus as shown in FIG. 3, the end count signal will be generated from clock pulse No. 91 to clock pulse No. 101 and the ready signal will be generated again starting at clock pulse No. 101. The AND gate 55 will thereupon no longer receive any enabling signal and the last pulse from the pulse generator 47 to pass through the AND gate 55 will be clock pulse No. 101, which sets the counter 43 back to zero. With this logic circuitary it will be noted that the precision switch 21, the flip-flop 48 and the counter 43 are operated solely by the precision pulses produced by the clock pulse generator 47. The clock pulses are made very precise in the preferred embodiment of the invention by using a crystal oscillator energizing a Schmitt trigger as the clock pulse generator 47. Because the precision switch 21, the flip-flop 48 and the counter 43 are all operated by the clock pulses, the operation of these units is more precise and reliable, and errors due to delay and instability in individual logic blocks do not accumulate. Because of this, the accuracy of the reset pulse generated by the precision switch 21 is very close to the accuracy of the clock pulse generator 47.

After the flip-flop 48 has been set, the positive voltage from the ONE output of the flip-flop 48 passing through the enabled AND gate 49 will enable an AND gate 63 which also receives the clock pulses produced by the clock pulse generator 47. The pulses passing through the AND gate 63 are applied to that input of the flip-flop 48 by means of which the flip-flop is set. Thus, after the flip-flop 48 has been set by clock pulse No. 1 passing through the AND gate 45, it will continue to receive clock pulses No. 2 through No. 91 through the AND gate 63 to ensure that it remains set. While the counter 43 is counting from two to ninety, clock pulses No. 3 through No. 91 will pass through the AND gate 51, which will be enabled to ensure that the precision switch 21 remains closed. After the flip-flop 48 is reset, the gate 61 will be enabled by a signal from the ZERO output of the flip-flop 48 so that the clock pulses will continue to pass through the gate 61 to ensure that the precision switch 21 remains open until the flip-flop 48 is again set. When the counter 43 produces the ready signal after recycling to zero, the timing logic 19 is again ready to respond to an enabling signal from the positive trigger 15 or from the negative trigger 17. The timing logic 19 responds to the enabling signal from the negative trigger 17 to control the precision switch 23 in exactly the same manner that it controls the precision switch 21 in response to the enabling signal from the positive trigger 15, and is provided with corresponding logic circuitry to carry out this function comprising the AND gate 41 corresponding to the AND gate 39, an AND gate 75 corresponding to the AND gate 45, a flip-flop 78 corresponding to the flip-flop 48, AND gates 79, 81 and 87 corresponding to AND gates 49, 51 and 57, an OR gate 89 corresponding to the OR gate 59, and AND gates 91 and 93 corresponding to AND gates 61 and 63. This logic circuitry operating in response to the negative trigger 17 cooperates with the clock pulse generator 47, the OR gate 53, the AND gate 55 and the counter 43 to control the precision switch 23 in the same manner that the precision switch 21 is controlled by the corresponding logic circuitry operating in response to the positive trigger 15. The positive voltage from the ONE output of the flip-flop 48 passing through the enabled AND gate 49 is applied to the counter 25 over the channel 24 and constitutes an output pulse from the timing logic 19 indicating a positive increment of the integral. A corresponding positive output voltage from the ONE output of the flip-flop 78 passing through the enabled AND gate 79 is applied over channel 27 to the counter 25 and constitutes a pulse representing a negative increment of the integral.

FIG. 4 is a block diagram illustrating the details of the binary counter 43. As shown in FIG. 4, the binary counter 43 comprises two decade counters 101 and 103. The decade counter 101 comprises four flip-flops 104 through 107. The flip-flop 104 receives the applied pulses from the clock pulse generator and switches to its opposite state in response to each applied pulse. Each time the flip-flop 104 switches to its ZERO state it applies a pulse to the flip-flop 105. The flip-flop 104 will thus produce output pulses at half the frequency of the applied clock pulses. The flip-flop 105 will be switched back to its ZERO state each time it is in its ONE state and a pulse applied thereto from the flip-flop 104 and will be switched to its ONE state each time it is in its ZERO state and a pulse is applied from the flip-flop 104 if the flip-flop 107 is also in its ZERO state. An AND gate 112 enabled only when the flip-flop 107 is in its ZERO state is used in the circuit of the flip-flop 105 to prevent the flip-flop 105 from being switched to its ZERO state when the flip-flop 107 is in its ONE state. The output pulses from the flip-flop 104 are also applied to the flip-flop 107 and will switch the flip-flop 107 to its ZERO state if it is in its ONE state. Each time the flip-flop 105 switches to its ZERO state, it will apply a pulse to the flip-flop 106 which, in response to each pulse applied from the flip-flop 105, will switch to the opposite state. Each time the flip-flop 106 switches to its ZERO state, it will apply a pulse to the flip-flop 107 to set the flip-flop 107 in its ONE state. When the flip-flop 107 is reset back to its ZERO state by the next output pulse from the flip-flop 104, the decade counter 101 produces an output pulse which is applied to the decade counter 103. With this arrangement the decade counter 101 will produce an output pulse for every ten input pulses applied to the input of the decade counter 101. When the first pulse is applied to the decade counter 101, all of the flip-flops 104 through 107 will be in their ZERO states. The decade counter 101 will then count as a true binary counter up through the seventh pulse applied to the input of the decade counter 101. At this point the flip-flops 104, 105 and 106 will be in their ONE states and the flip-flop 107 will be in its ZERO state. The next pulse applied to the input of the counter 101 will cause all of the flip-flops 104, 105 and 106 to switch to their ZERO states and the output pulse from the flip-flop 106 will switch the flip-flop 107 to its ONE state. The ninth pulse applied to the counter 101 will switch the flip-flop 104 to its ONE state. The tenth pulse applied to the input of the counter 101 will switch the flip-flop 104 back to its ZERO state and the output pulse produced from the flip-flop 104 will be applied to the flip-flop 107 to switch the flip-flop 107 to its ZERO state. Upon switching to its ZERO state, the flip-flop 107 produces the output pulse of the decade counter 101 applied to the input of the decade counter 103. When the flip-flop 104 switches to its ZERO state on the application of the tenth pulse to the counter 101, the resulting pulse applied to the flip-flop 105 will not switch this flip-flop to its ONE state since the flip-flop 107 will not yet be in its ZERO state. Therefore after the tenth pulse is applied to the counter 101, all of the flip-flops 104 through 107 will be in their ZERO states. Hence the counter 101 recycles upon every ten applied input pulses. Counter 103 comprises four flip-flops 108 through 111 and is identical to the counter 101. Counter 103 therefore also recycles upon every ten applied input pulses. The counters 101 and 103 together therefore recycle to zero every 100 pulses applied to the input of the counter 101. When the flip-flop 108 and the flip-flop 111 are in their ONE states, they both apply enabling signals to a gate 113 which in response thereto produces a positive enabling signal on an output 115. The output from the AND gate 113 is also applied to an inverter 117 which produces a positive enabling signal on an output 119 whenever the gate 113 is not producing a positive enabling output signal. The end count signal is produced from the output 115 and the ready signal is produced from the output 119. The flip-flops 108 and 111 will both be in their ONE states only when the count registered by the counter 103 is nine. Thus the AND gate 113 will produce a positive enabling signal on output 115 when the ninth pulse is applied to the input of the counter 103 or when the ninetieth pulse is applied to the input of the counter 101. Since the counter 103 will register nine until it receives the next output pulse from the counter 101, the AND gate 113 will continue to produce a positive enabling signal on output 115 until the one-hundredth pulse is applied to the input of the counter 101 recycling both counters 101 and 103 to zero. Thus a positive enabling signal is produced on output 115 from the ninetieth to the one hundredth pulse applied to the counter 101 and at all other times a positive enabling signal is produced at output 119.

The above described integrator thus combines features of both analog and digital integrators to have a much higher scale factor than is possible with a pure analog integrator with the attendant advantages of this high scale factor but without the complexity and weight of a digital integrator.

When a reset integrator as described above is employed in an analog system for very high accuracy integration, an analog output would normally be provided in the form of the angular position of an output shaft from a stepping motor. The speed of operation of a stepping motor is limited to approximately 200 steps per second for a 90° step. Because of the limitation of the operating speed of the stepping motor, the resolution of the stepping motor output, that is the value represented by each step in the output from the motor, is limited if a maximum input to the integrator is defined. For example, if the maximum input acceleration to be integrated is 100 feet per second squared and the maximum operating speed of the stepping motor is 200 steps per second, then for maximum resolution, 200 steps will represent a velocity change of 100 feet per second. In other words each step can represent a velocity change of no less than ½ foot per second.

The system illustrated in FIG. 5 provides a resolution of at least one order of magnitude greater than the system described with reference to FIGS. 1–4. The system of FIG. 5 achieves this greater resolution by means of a dual speed operation. In the system a short reset pulse is applied to the input of the analog integrator when the input is small and when the input is large a long reset pulse is applied to the input of the analog integrator. Both the long and short reset pulses are counted by stepping motors to provide a precise analog representation of the input.

The system as shown in FIG. 5 comprises an analog integrator 13 (FIG. 5a), which is like the analog integrator 13 of the system illustrated in FIG. 2. The output from the analog integrator 13 is applied to four triggers 121 through 124. The trigger 121 is actuated in response to a negative output signal of the integrator 13 having a magnitude greater than the trigger value of the trigger 121. The trigger 122 is actuated whenever a negative output signal of the integrator 13 has a magnitude greater than the trigger value of the trigger 122. The trigger value of the trigger 121 is greater than that of the trigger 122 and in the preferred embodiment the trigger value of the trigger 121 is 10 times that of the trigger 122. The trigger 123 is actuated whenever a positive output signal of the integrator 13 has a magnitude greater than its trigger value and the trigger 124 is actuated whenever a positive output signal of the integrator 13 has a magnitude greater than its trigger value. The magnitude of the trigger value for the trigger 123 is equal to that of the trigger 122 and the magnitude of the trigger value for the trigger 124 is equal to that of the trigger 121.

When the trigger circuit 122 is actuated, it applies an enabling signal to an AND gate 126. Start pulses from a stop-start clock generator 127 (FIG. 5b) are also applied to the AND gate 126 and when the AND gate 126 receives an enabling signal from the trigger 122 it will pass the next start pulse applied from the clock generator 127 to set a flip-flop 129. When the trigger circuit 123 is actuated, it applies an enabling signal to an AND gate 142, which also receives the start pulses generated by the clock generator 127. When a start pulse passes through the AND gate 142, as a result of its being enabled by the output signal from the trigger 123, it sets a flip-flop 144.

The clock generator 127 comprises a 20 kilocycle oscillator 130, the output of which is fed to a wave shaper 131, which produces output pulses at a frequency of 20 kilocycles per second. The time interval between two successive pulses is therefore 50 microseconds. One start pulse is generated by the clock generator 127 for every 100 pulses produced by the pulse shaper 131. To facilitate the description of the operation, the pulses produced by the pulse shaper 131 are numbered sequentially from 1 to 100 with the numbering cyclically repeating as the pulse shaper 131 continuously produces output pulses. The start pulses, which are produced at an output 133 of the clock generator 127, occur simultaneously with pulses #1 in each cycle of 100. The clock generator 127 also generates stop pulses at an output 135 and at an output 137. The stop pulses produced on output 135 occur simultaneously with pulses #10 through #90 produced by the pulse shaper 131. The stop pulses produced on output 137 occur simultaneously with pulses #91 through #100 produced by the pulse shaper 131. The clock generator 127 produces the stop pulses on outputs 135 and 137 cyclically with each group of pulses #1 through #100 produced by the pulse shaper 131.

The stop pulses produced on output 135 are applied to an AND gate 139, which will be enabled as will be described below if neither of the triggers 121 or 124 are actuated. If the AND gate 139 is enabled, the stop pulses produced on output 135 will pass through the AND gate 139 and through an OR gate 141 to both the flip-flops 129 and 144 and will reset either one of these flip-flops if such flip-flop has been set by a start pulse. Thus when the magnitude of a negative output signal of the integrator 13 increases to a value sufficient to actuate the trigger 122 but insufficient to actuate the trigger 121, the flip-flop 129 will be set by a start pulse at a pulse #1 and then be reset at pulse #10, when the next stop pulse occurs on output 135. Thus the flip-flop 129 will be set for the time period between pulses #1 and #10 or for a period of 450 microseconds. When the flip-flop 129 is set it applies an enabling signal to a precision switch 143, which in response to the enabling signal closes and remains closed only as long as the enabling signal is applied from the flip-flop 129. When the precision switch 143 closes, it applies a positive reference voltage to an input of the analog integrator 13 to be integrated thereby. Thus the precision switch 143 will apply to the integrator 13 a positive reset pulse with a precise amplitude and a duration of 450 microseconds in response to the magnitude of a negative output signal of the analog integrator 13 rising to a value sufficient to actuate the trigger 122 but insufficient to actuate the trigger 121. The magnitude of the positive reference voltage is selected so that the magnitude of the output signal of the integrator 13 will be reduced by an amount equal to the trigger value of the trigger 122. Similarly when a positive output signal of the integrator 13 increases to a value sufficient to actuate the trigger 123 but insufficient to actuate the trigger 124, the flip-flop 144 will be set by the next start pulse #1 and then be reset at pulse #10 when the next stop pulse occurs on output 135 of the clock generator 127. Thus the flip-flop 144 will be set for the 450 microseconds between pulses #1 and #10. When the flip-flop 144 is set it applies an enabling signal to a precision switch 146, which in response to the enabling signal closes and remains closed only as long as the enabling signal is applied. When the precision switch 146 closes it applies a negative reference voltage to the analog integrator 13 to be integrated thereby. The magnitude of the negative reference voltage is equal to that of the positive reference voltage, which is selectively applied to the input of the integrator 13 by the precision switch 143. Thus, in response to an output signal of the integrator 13 rising to a value sufficient to actuate the trigger 123 but insufficient to actuate the trigger 124, the precision switch 146 will apply a reset 450 microsecond pulse to the input to the integrator 13 to reduce the output signal of the integrator 13 by an amount equal to the trigger value of the trigger 123.

When the trigger 121 is actuated it will apply an enabling signal through an OR gate 145 to an AND gate 147, which also receives the start pulses produced on output 133 of the clock generator 127. Thus when the magnitude of a negative output signal of the integrator 13 increases above the trigger value of the trigger 121, the AND gate 147 will be enabled and will pass the next start pulse generated on output 133. When a start pulse passes through the AND gate 147 it sets a flip-flop 149. When the trigger 124 is actuated in response to a positive output signal of the integrator 13 increasing above its trigger value, the trigger 124 will apply a signal through the OR gate 145 to enable the AND gate 147, which thereupon will pass the next start pulse from the clock generator 127 to set the flip-flop 149. Thus whenever the magnitude of the output from the integrator 13 rises above the trigger value of the triggers 121 and 124, the flip-flop 149 will be set and this setting of the flip-flop 149 will occur when the next start pulse is produced by the clock generator 127 after the magnitude of the output signal from the integrator 13 has increased above this trigger value.

When the flip-flop 149 is in its reset state as opposed to its set state, it enables the AND gate 139 and the AND gate 139 will not be enabled when the flip-flop 149 is set. Thus the AND gate 139 will be enabled when the magnitude of the output signal of the integrator 13 rises to a value above the trigger value of the triggers 122 and 123 but below the trigger value of the triggers 121 and 124 so that the stop pulses on output 135 of the clock generator 127 will reset the one of the flip-flops 129 and 144 that has been set and the appropriate one of the precision switches 143 and 146 will apply a 450 microsecond reset pulse to the integrator 13. When the flip-flop 149 is set by a start pulse, it will be reset by the first stop pulse produced on output 137 by the clock generator 127. Thus when the output from the integrator 13 rises above the trigger value of the triggers 121 and 124, the flip-flop 149 will be set for the period between pulse #1 when the start pulse is produced and pulse #91 when the first stop pulse is produced on output 137. Accordingly, the AND gate 139 will not be enabled during this period and will not pass the stop pulses on output 135 to reset the flip-flop 129 or the flip-flop 144. The stop pulses produced on output 137 are applied through the OR gate 141 also to reset the flip-flops 129 and 144. Thus when the AND gate 139 is not enabled, the one of the flip-flops 129 and 144 that has been set in accordance with the polarity of the output signal from the integrator 13 will be reset at pulse #91, which is when the next stop pulse is produced on output 137 after a start pulse is produced. Thus when both of the triggers 121 and 122 are actuated, the flip-flop 129 will be set for the interval between pulse #1 and pulse #91. Accordingly the precision switch 143 will be closed and will apply the positive reference voltage to the input of the integrator 13 for this interval. Thus when a negative input signal applied to the integrator 13 has a sufficient magnitude to cause the magnitude of the output signal of the integrator 13 to rise past the trigger value of the trigger 122 and past the trigger value of the trigger 121, the precision switch 143 applies to the integrator 13 a long reset pulse of 4.5 milliseconds, which is 10 times the length of the short 450 microsecond pulse that it applies to the integrator 13 when only the trigger 122 is actuated. Similarly when a large positive signal is applied to the input of the integrator 13 such that the output signal of the integrator 13 rises to a positive value sufficient to actuate both triggers 123 and 124, the flip-flop 144 will be set for the 4.5 millisecond time interval between pulses #1 and #91 and accordingly the precision switch 146 will apply the negative reference voltage to the input of the integrator 13 for this period. Accordingly the precision switch 146 applies a negative reset pulse 10 times the length of the short 450 millisecond pulse that it applies to the integrator 13 when only the trigger 123 is actuated.

It will be apparent that since the trigger value for the triggers 121 and 124 is 10 times the trigger value for the triggers 122 and 123 and the length of the long reset pulses is 10 times the length of the short reset pulses, the long reset pulses will reduce the magnitude of the output signal of the integrator 13 by an amount equal to the trigger value of the triggers 121 and 124. For the short and long reset pulses to reduce the magnitude of the output signal of the integrator 13 by amounts equal to the trigger value of the triggers 122 and 123 and the trigger value of the triggers 121 and 124 respectively, the ratio of the length of the long reset pulses to the length of the short reset pulses must be the same as the ratio of the trigger value of the triggers 121 and 124 to the trigger value of the triggers 122 and 123.

The flip-flop 149 enables a pair of AND gates 151 and 153 whenever it is in its reset state and enables a pair of AND gates 155 and 157 whenever it is in its set state. The signal produced by the flip-flop 129 when it is set is applied to AND gates 151 and 155. When the flip-flop 129 is set for just the short time interval between pulses #1 and #10, the flip-flop 149 will be in its reset state and the output signal from the flip-flop 129 will pass through the enabled AND gate 151 to an output 159. Thus, whenever the precision switch 143 applies a short reset pulse to the input of the integrator 13, a pulse is produced on output 159. When the flip-flop 129 is set for the interval between pulses #1 and #91, the flip-flop 149 will be in its set state and the output signal produced by the flip-flop 129 will pass through the enabled AND gate 155 to an output 161. Thus whenever the precision switch 143 applies a long reset pulse to the input of the integrator 13, a pulse is produced on output 161. The signal produced by the flip-flop 144 when it is set is applied to the AND gates 153 and 157. Whenever the flip-flop 144 is set for the time interval between pulses #1 and #10 so that the precision switch 146 applies a short reset pulse to the input of the integrator 13, the flip-flop 149 will be in its reset state and will enable the AND gate 153. The output signal produced by the flip-flop 144 will therefore pass through the enabled AND gate 153 to an output 163. Thus whenever the precision switch 146 applies a short reset pulse to the input of the integrator 13, a pulse is produced on output 163. Whenever the flip-flop 144 is set for the time interval between pulses #1 and #91 so that the precision switch 126 applies a long reset pulse to the input of the integrator 13, the flip-flop 149 will be in its set state and the AND gate 157 will be enabled. Accordingly the output signal produced by the flip-flop 144 will pass through the AND gate 157 to an output 165. Hence a pulse will be produced on output 165 whenever the precision switch 146 applies a long negative reset pulse to the input of the integrator 13. Thus, the number of pulses produced on output 159 will indicate the number of times the integrator 13 is reset with short positive pulses; the number of pulses produced on output 163 will indicate the number of times the integrator 13 is reset with short negative pulses; the number of pulses produced on output 161 will indicate the number of times the integrator 13 is reset with long positive pulses; and the number of pulses produced on output 165 will indicate the number of times that the integrator 13 is reset with long negative pulses. By counting the number of pulses produced on outputs 159, 161, 163 and 165 the integral of the signal applied to the input of the integrator 13 can be determined. In this determination the pulses produced on outputs 161 and 165 are weighted 10 times as much as the pulses produced on outputs 159 and 163. The pulses produced on outputs 159 and 161 indicate a change in the integral in the negative direction and the pulses produced on outputs 163 and 165 indicate a change in the integral in the positive direction. To determine the integral the number of pulses produced on output 161 are subtracted from the number of pulses produced on output 165 to produce a first difference and the number of pulses produced on output 159 is subtracted from the number of pulses produced on output 163 to produce a second difference. The second difference is then added to 10 times the first difference to provide the precise integral of the input signal. The output pulses produced on outputs 159, 161, 163 and 165 may be readily converted into an analog signal by means of stepping motors with one stepping motor being operated by the pulses produced on outputs 161 and 165 and another stepping motor being operated by the output pulses produced on outputs 159 and 163. The shaft rotations of the two stepping motors can then be combined into a single analog shaft position by using appropriate reduction gearing and a mechanical summing device such as a differential.

In the clock generator the output pulses from the pulse shaper 131 are applied to the input of a decade counter 167 which feeds pulses to a decade counter 169 at one-tenth the frequency of the pulses produced by the pulse shaper 131. Decade counters 167 and 169 are like the decade counters 101 and 103 illustrated in detail in FIG. 4. Counter 167 recycles once for every ten pulses applied from the pulse shaper 131 and the decade counter 169 recycles once for every ten pulses applied from the decade counter 167, or once for every one hundred pulses applied from the pulse shaper 131. Pulse #1 produced by the pulse shaper 131 is the first pulse produced after the decade counter 169 has recycled to zero, at which time the decade counter 167 will also recycle to zero. The output pulses from the first stage and the fourth stage of the decade counter 167 are fed to an AND gate 171 so that the AND gate 171 produces an output signal voltage only when the flip-flops of the first and fourth stages of the decade counter 167 are in their ONE states. As a result, the AND gate 171 will produce a train of square wave output pulses with one pulse being produced for every 10 pulses produced by the wave shaper 131. One of these square wave pulses will start at pulse #9 and end at pulse #10, the next will start at pulse #19 and end at pulse #20, the next will start at pulse #29 and end at pulse #30, etc. These square wave pulses actually start and end a little after the pulses produced by the wave shaper 131 due to flip-flop switching time in the decade counter 167. The outputs from the first and fourth stages of the decade counter 169 are fed to an AND gate 173, which produces an output signal whenever the flip-flops of both the first and fourth stages of the decade counter 169 are in their ONE states. As a result the AND gate 173 produces a train of square wave output pulses, one for every hundred pulses produced by the pulse shaper 131, and these pulses start at pulse #90 and end at pulse #100. Like the pulses produced by the AND gate 171, the pulses produced by the AND gate 173 actually start a little bit after the pulses produced by the pulse shaper 131 due to the switching time of the flip-flops of the decade counters. The pulses produced by the AND gate 171 are applied to a flip-flop 175 to set it, and the pulses produced by the AND gate 173 are applied to the flip-flop 175 to reset it. As a result, the flip-flop 175 will be set just after pulse #9 produced by the pulse shaper 131 and then will be reset just after pulse #90. The pulse produced by the AND gate 171 between pulses #99 and #100 will not again set the flip-flop 175 because the flip-flop 175 will be simultaneously still receiving a pulse from the AND gate 173 starting at pulse #90 and ending at pulse #100. As a result the flip-flop 175 will be in a set condition starting just after pulse #9 and ending just after pulse #90. It will be in a reset state starting just after pulse #90 and ending just after pulse #9. When the flip-flop 175 is in a set state, it applies an enabling signal to an AND gate 177. The pulses produced by the pulse shaper 131 are also applied to the AND gate 177 and will pass through the AND gate 177 to the output 135 when the AND gate 177 is enabled. The pulses #10 through #90 will pass through the AND gate 177 and be produced on output 135. In this manner the desired stop pulses are produced on output 135. The square wave pulses produced by AND gate 173 are also applied to AND gate 179, which also receives the pulses produced by the pulse shaper 131. When the AND gate 179 is enabled, it will pass the pulses produced by the pulse shaper 131 to the output 137. As a result, pulses #191 through #100 will pass through the AND gate 179 and the desired stop pulses will be produced on output 137. The pulses produced by the AND gate 173 are applied to an inverter 181, which inverts the applied waveform and as a result applies a long square wave pulse starting just after pulse #100 and ending just after pulse #90 to a monostable multivibrator, which in response to receiving the square wave pulse applies a 70 microsecond enabling pulse to an AND gate 185. As a result, a 70 microsecond enabling pulse starting just after pulse #100 is applied to the AND gate 185. Since the time between the output pulses produced by the pulse shaper 131 is 45 microseconds, the pulse applied to the AND gate 185 by the monostable multivibrator 183 will end between pulses #1 and #2. The output pulses produced by the pulse shaper 131 are applied to the AND gate 185 and the AND gate 185 will be enabled only when pulse #1 is applied to the AND gate 185. As a result, only pulse #1 will pass through the AND gate 185 to the output 133 and accordingly the desired start pulses are produced on output 133.

Because the reset integrator shown in FIG. 5 uses reset pulses of different impulse content depending upon the size of the input signal being integrated, much greater resolution may be obtained in the output for a defined maximum input. The change in integral represented by a short reset pulse determines the resolution of the output, whereas the change in integral represented by a long reset pulse together with the rate that output pulses may be counted such as by a stepping motor, determines the maximum input signal. Since the long reset pulse represents a much larger change in integral, the system can respond to a much larger input signal than can the system of FIGS. 1 through 4 if its resolution is the same.

Many modifications may be made to the above described specific embodiments of the invention without departing from the spirit and scope of the invention, which is defined in the appended claims.

What is claimed is:

1. An integrating device comprising an analog integrator, a first source of reference voltage, a second source of reference voltage having the same magnitude as and the opposite polarity from said first reference voltage, a pulse generator for producing pulses in precise time intervals, a first precision switch operable when closed to connect said first reference voltage to the input of said analog integrator, a second precision switch operable when closed to connect said second reference voltage to the input of said analog integrator, means coupled to said integrator and to said pulse generator and being responsive to a positive output signal voltage of said analog integrator when said output signal reaches a predetermined trigger magnitude to close said first precision switch for the duration of a specific number of pulses of said pulse generator to establish a precisely predetermined time interval, and means coupled to said integrator and to said pulse generator and being responsive to a negative output signal of said analog integrator when said output signal reaches said predetermined trigger magnitude to close said second precision switch for the duration of a specific number of pulses of said pulse generator to establish said precisely predetermined time interval, said time interval being related to said magnitude of said first and second reference voltages and said trigger magnitude and said first and second reference voltages having polarities so that the output signal of said analog integrator is reduced by said predetermined trigger magnitude when one of said first and second precision switches is closed for said time interval.

2. An integrating device comprising an analog integrator, a first source of reference voltage, a second source of reference voltage having the same magnitude as and the opposite polarity from said first source of reference voltage, a first precision switch operable when closed to connect said first source of reference voltage to the input of said analog integrator, a second precision switch operable when closed to connect said second source of reference voltage to the input of said analog integrator, a pulse generator for producing pulses in precise time intervals, means coupled to said integrator and to said pulse generator and being responsive to a positive output signal of said analog integrator when said output signal reaches a predetermined trigger magnitude to close said first precision switch for the duration of a specific number of pulses from said pulse generator to establish switch closure for a precisely predetermined time interval, means coupled to said integrator and to said pulse generator and being responsive to a negative output signal of said analog integrator when said output signal reaches said predetermined trigger magnitude to close said second precision switch for the duration of a specific number of pulses from said pulse generator to establish switch closure for said precisely predetermined time interval, said time interval being related to the magnitude of said reference voltages and to said trigger magnitude and said reference voltages having polarities so that the output signal of said analog integrator is reduced by said trigger magnitude when one of said first and second precision switches is closed for said time interval, and means coupled to both of said switch closing means to count in a positive direction each time said first precision switch is closed for said time interval and to count in a negative direction each time said second precision switch is closed for said time interval.

3. An integrating device comprising an analog integrator, a source of reference voltage, a precision switch operable to connect said reference voltage to the input of said analog integrator in response to a pulse applied to a first input and to disconnect said reference voltage from the input of said analog integrator in response to a pulse applied to a second input, a clock pulse generator, a counter operable to count applied pulses, and means responsive to the output signal of said analog integrator reaching a predetermined trigger value to apply the output pulses from said clock pulse generator to said counter and to the first input of said precision switch and operable to the count in said counter reaching a predetermined number to apply the output pulses of said clock pulse generator to the second input of said precision switch to thereby cause said precision switch to connect said reference voltage to the input of said analog integrator for a precise time interval.

4. An integrating device comprising an analog integrator, a first source of reference voltage, a second source of reference voltage having the same magnitude as and the opposite polarity from said first source of reference voltage, a first precision switch operable to connect said first source of reference voltage to the input of said analog integrator in response to a pulse applied to a first input and to disconnect said first source of reference voltage from the input of said analog integrator in response to a pulse applied to a second input, a second precision switch operable to connect said second source of reference voltage to the input of said analog integrator in response to a pulse applied to a first input and to disconnect said second source of reference voltage from the input of said analog integrator in response to a pulse applied to a second input, a clock pulse generator, a counter operable to count applied pulses, means responsive to a positive output signal of said analog integrator when said output signal reaches a predetermined trigger magnitude to apply the output of said clock pulse generator to said counter and to the first input of said first precision switch and operable thereafter to the count in said counter reaching a predetermined number to apply the output of said clock pulse generator to the second input of said first precision switch to cause said first precision switch to connect said first source of reference voltage to the input of said analog integrator for a precise time interval, and means responsive to a negative output signal of said analog integrator when said output signal reaches said predetermined trigger magnitude to apply the output of said clock pulse generator to said counter and to the first input of said second precision switch and operable thereafter to the count in said counter reaching said predetermined number to apply the output of said clock pulse generator to the second input of said second precision switch to thereby cause said second precision switch to connect said second source of reference voltage to the input of said analog integrator for said precise time interval, and the polarities of said reference voltages being such that the magnitude of the output signal of said analog integrator is reduced when one of said first and second precision switches connects one of said reference voltages to the input of said analog integrator.

5. An integrating device comprising an analog integrator, means responsive to the output signal voltage of said analog integrator when said output signal exceeds a first predetermined value and polarity to initiate application to the input of said analog integrator a pulse having a first precisely predetermined magnitude and switch means for maintaining application of said pulse for a precisely predetermined time interval to apply an impulse of precisely predetermined impulse content and having a polarity to reduce the output signal voltage of said integrator and means responsive to the output signal voltage of said analog integrator exceeding a second predetermined value greater than and of the same polarity as said first predetermined value to initiate application to the input of said analog integrator a pulse having a second precisely predetermined impulse content greater than said first predetermined impulse content and having a polarity to reduce the output signal voltage of said integrator.

6. An integrating device comprising an analog integrator, first means responsive to a positive output signal voltage of said analog integrator when said output signal exceeds a value having a first predetermined magnitude to apply to the input of said analog integrator a pulse having a first precisely predetermined impulse content and having a polarity to reduce the output signal voltage of said analog integrator and responsive to a positive output signal voltage of said analog integrator exceeding a value having a second predetermined magnitude greater than said first predetermined magnitude to apply to the input of said analog integrator a pulse having a second precisely predetermined impulse content greater than said first predetermined impulse content and having a polarity to reduce the output signal voltage of said analog integrator, and second means responsive to a negative output signal voltage of said analog integrator exceeding said first predetermined magnitude to apply to the input of said analog integrator a pulse having said first precisely predetermined impulse content and a polarity to reduce the output signal voltage of said analog integrator and responsive to a negative output signal voltage of said analog integrator exceeding said second predetermined magnitude to apply to the input of said analog integrator a pulse having said second precisely predetermined impulse content and a polarity to reduce the output signal voltage of said analog integrator.

7. An integrating device comprising an analog integrator, first means responsive to a positive output signal potential from said analog integrator of a predetermined threshold value to produce an output potential, a pulse generating means for producing pulses in precisely predetermined time intervals, switch means and switch control means responsive to the coincident application of output potentials from said first means and said pulse generating means for applying to the input of said integrator a potential pulse of precisely predetermined magnitude and for a duration of a specific number of pulses of said pulse generating means and having an impulse content to reduce the output signal potential of said analog integrator by said threshold value and second means responsive to a negative output signal potential of said analog integrator of said predetermined threshold value to produce an output potential, additional switch means and switch control means responsive to the coincident application of output potentials from said second means and said pulse generating means for applying to the input of said integrator a potential pulse of precisely predetermined magnitude and for a duration of a specific number of pulses of said pulse generating means and having an impulse content to reduce the output signal potential of said analog integrator by said threshold value.

8. An integrating device according to claim 7 additionally comprising means to count in a positive direction each time said analog integrator is reset to zero by a pulse from said first means and to count in a negative direction each time said analog integrator is reset to zero by a pulse from said second means.

References Cited
UNITED STATES PATENTS

| | | | |
|---|---|---|---|
| 2,891,725 | 6/1959 | Blumenthal et al. | 235—183 |
| 2,903,185 | 9/1959 | Myers | 235—183 |
| 2,950,052 | 8/1960 | Knox | 235—183 |
| 3,002,690 | 10/1961 | Meyer | 235—183 |
| 3,188,455 | 6/1965 | Quick | 235—183 |
| 3,231,724 | 1/1966 | Andrews | 235—150.51 |

MALCOLM A. MORRISON, *Primary Examiner.*

I. KESCHNER, J. F. RUGGIERO,
*Assistant Examiners.*